US012036803B2

(12) United States Patent
Knittle et al.

(10) Patent No.: US 12,036,803 B2
(45) Date of Patent: *Jul. 16, 2024

(54) MEDICAL DEVICE SURFACE MADE BY ROLL-TO-ROLL DIGITAL PRINTING, CUTTING, AND PUNCHING

(71) Applicant: Hill-Rom Services, Inc., Batesville, IN (US)

(72) Inventors: Brett Knittle, Oldenburg, IN (US); Genaro Guajardo, San Nicolás de los Garza (MX); Taylor Franklin, Batesville, IN (US); James Evans, Evansville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,365

(22) Filed: Feb. 22, 2023

(65) Prior Publication Data
US 2023/0191799 A1    Jun. 22, 2023

Related U.S. Application Data

(63) Continuation of application No. 17/028,270, filed on Sep. 22, 2020, now Pat. No. 11,607,891.

(60) Provisional application No. 62/906,961, filed on Sep. 27, 2019.

(51) Int. Cl.
| | | |
|---|---|---|
| *B41J 3/01* | (2006.01) | |
| *B41J 3/407* | (2006.01) | |
| *B41J 11/00* | (2006.01) | |
| *B41M 5/00* | (2006.01) | |
| *B41M 7/00* | (2006.01) | |
| *C09D 11/30* | (2014.01) | |
| *D06P 5/30* | (2006.01) | |

(52) U.S. Cl.
CPC ............... *B41J 3/01* (2013.01); *B41J 3/4078* (2013.01); *B41J 11/002* (2013.01); *B41M 5/0047* (2013.01); *B41M 7/0081* (2013.01); *C09D 11/30* (2013.01); *D06P 5/30* (2013.01)

(58) Field of Classification Search
None
See application file for complete search history.

(56) References Cited

U.S. PATENT DOCUMENTS

| | | |
|---|---|---|
| 5,085,668 A | 2/1992 | Pelseter et al. |
| 5,251,547 A | 10/1993 | Frigeni |
| 5,273,551 A | 12/1993 | Brehme et al. |
| 5,389,108 A | 2/1995 | Fritzsche et al. |
| 5,397,848 A | 3/1995 | Yang et al. |
| 5,510,415 A | 4/1996 | Zahrobsky et al. |
| 5,542,972 A | 8/1996 | von der Eltz et al. |
| 5,607,482 A | 3/1997 | Reiff et al. |
| 5,679,115 A | 10/1997 | Fritzsche et al. |

(Continued)

*Primary Examiner* — Alejandro Valencia
(74) *Attorney, Agent, or Firm* — Barnes & Thornburg LLP

(57) ABSTRACT

A method for preparing a material for use as a surface of a medical device may include printing, with an ink jet printer and using ink that is curable with ultraviolet light, content onto a surface of material that includes woven ticking fabric laminated with polyurethane. The method may also include curing the ink with the ultraviolet light. The method may also include cutting a section of the material in registration to the content printed on the surface for use in a medical device.

20 Claims, 5 Drawing Sheets

(56) References Cited

U.S. PATENT DOCUMENTS

| | | | |
|---|---|---|---|
| 5,698,478 | A | 12/1997 | Yamamoto et al. |
| 5,709,955 | A | 1/1998 | Nohr et al. |
| 5,747,550 | A | 5/1998 | Nohr et al. |
| 5,811,199 | A | 9/1998 | MacDonald et al. |
| 5,853,861 | A | 12/1998 | Held |
| 5,936,027 | A | 8/1999 | Zahrobsky et al. |
| 6,001,137 | A | 12/1999 | Alfekri et al. |
| 6,095,025 | A | 8/2000 | Mirabello |
| 6,513,924 | B1 | 2/2003 | Goldberg et al. |
| 7,011,007 | B2 | 3/2006 | Stein |
| 7,506,974 | B2 | 3/2009 | Hirakawa |
| 7,594,722 | B2 | 9/2009 | Kadomatsu et al. |
| 7,661,807 | B2 | 2/2010 | Nakano et al. |
| 8,080,301 | B2 | 12/2011 | Goodwin et al. |
| 9,440,480 | B1 | 9/2016 | Lefevre et al. |
| 10,457,825 | B2 | 10/2019 | Cong |
| 10,759,074 | B2 | 9/2020 | Zund et al. |
| 10,857,814 | B2 | 12/2020 | Allen et al. |
| 11,607,891 | B2 * | 3/2023 | Knittie .................. D06P 5/30 |
| 2004/0022568 | A1 | 2/2004 | Menendez et al. |
| 2006/0078714 | A1 * | 4/2006 | Dempster ............ B65H 18/025 101/329 |
| 2006/0087113 | A1 * | 4/2006 | Snyder .................. B42D 5/026 283/106 |
| 2006/0196374 | A1 | 9/2006 | Stemmle et al. |
| 2008/0083740 | A1 | 4/2008 | Kaiserman et al. |
| 2009/0094755 | A1 | 4/2009 | Murphy et al. |
| 2014/0038802 | A1 | 2/2014 | Clark et al. |
| 2018/0345619 | A1 | 12/2018 | Lang et al. |
| 2019/0134985 | A1 * | 5/2019 | Fujisawa ................ B41J 2/1721 |
| 2019/0202214 | A1 | 7/2019 | Allen et al. |
| 2021/0094317 | A1 | 4/2021 | Knittle et al. |

* cited by examiner

MEDICAL DEVICE SURFACE MADE BY ROLL-TO-ROLL DIGITAL PRINTING, CUTTING, AND PUNCHING

CROSS-REFERENCE TO RELATED APPLICATION

This application is a continuation of U.S. application Ser. No. 17/028,270, filed Sep. 22, 2020, now U.S. Pat. No. 11,607,891, which claims the benefit, under 35 U.S.C. § 119(e), of U.S. Provisional Patent Application No. 62/906,961, filed Sep. 27, 2019, each of which is hereby expressly incorporated by reference herein in its entirety.

BACKGROUND

The present disclosure relates to manufacturing medical device surfaces and particularly, to printing on, cutting, and punching materials used to make medical device surfaces.

Conventional manufacturing processes for medical device surfaces involve using a manual or semi-digital cutting table to cut a roll of material into sections. The sections are then folded and transferred to a manual silk screen printing area where personnel print onto the sections of material using inks that can require two to three days to cure. The silk screen printing process may require a team of four operators and a team leader. Further, the silk screen process may use solvent based inks that are mixed manually and have significantly limited pot life before they dry out and are no longer usable. Depending on the particular process used to dry the ink, either a significant amount of space is used (e.g., for drying racks) or a large amount of energy is consumed (e.g., to heat the air to approximately 300 degrees to enable curing while also cooling other areas of the facility to compensate from the added heat). Additionally, clean-up operations are performed with hazardous chemicals and are labor intensive.

SUMMARY

The present application discloses one or more of the features recited in the appended claims and/or the following features which, alone or in any combination, may comprise patentable subject matter:

According to a first aspect of the present disclosure, a method for preparing a material for use as a surface of a medical device may include printing, with an ink jet printer and using ink that may be curable with ultraviolet light, content onto a surface of material that may include woven ticking fabric laminated with polyurethane. The method may also include curing the ink with the ultraviolet light. Additionally, the method may include cutting a section of the material in registration to the content printed on the surface for use in a medical device.

In some embodiments of the first aspect, the method may further include unwinding the material from a roll, before printing the content onto the surface. It is contemplated in this disclosure that in printing the content with ink that may be curable with ultraviolet light, the method may include printing with white ink that may be curable with ultraviolet light. Optionally, the method may include printing multiple layers of the ink onto the surface of the material (e.g., to increase the opacity/thickness and durability of the applied ink). Some embodiments of the method may include printing onto multiple rolls of the material concurrently. In some embodiments, the method may include printing a code indicative of instructions for cutting the material. For example, in some embodiments, the method may include printing a two-dimensional barcode. It is contemplated that in some embodiments of the first aspect, printing the code may include printing the code at each of multiple corners of the section to be cut.

In some embodiments of the first aspect, cutting the section may include cutting the section into at least a portion of a medical mattress topper. The method of the first aspect, in some embodiments, may include cutting the section with a cutter device configured to read a file that may define instructions for cutting the material into at least a portion of a medical device and executing the instructions.

Optionally, the method of the first aspect may include printing a code that may identify a file having instructions for cutting the material. Further, cutting the section of the material may include obtaining the file and cutting the section of the material based on the instructions. In some embodiments of the first aspect, cutting the section may include cutting the section into at least a portion of a blood pressure cuff. It is also contemplated that, in at least some embodiments, the method may additionally include punching at least one hole in the material.

According to a second aspect of the present disclosure, a method may include unwinding a roll of material that may include a ticking fabric that may be usable as a surface of a medical device. The method may also include printing, with an ink that may be curable using ultraviolet light, content onto the material. Additionally, the method may include cutting, by an automated/semi-automated cutter device, a section of the material from the roll after the content has been printed onto the material. In some embodiments of the method of the second aspect, the cutting may include cutting the material based on a set of instructions that may be defined in a file that is readable by the cutter device.

According to a third aspect of the present disclosure, a method may include unwinding a roll of material that may have a ticking fabric. The method may also include identifying, by a cutter device, content printed on the material in an ink that may have been cured by ultraviolet light. Further, the method may include determining, by the cutter device and based on the content, a set of instructions for cutting a section of the material from the roll. In addition, the method may include cutting, by the cutter device, the section of the material from the roll based on the instructions.

In some embodiments of the method of the second aspect, identifying content may include identifying a two-dimensional barcode that may be printed in white ink (or another color of ink) that may have been cured by ultraviolet light. It is also contemplated in this disclosure that the method of the second aspect may include punching one or more holes in the material based on the instructions. Additionally or alternatively, in at least some embodiments of the second aspect, cutting the section of the material may include cutting the section into at least a portion of a topper for a medical mattress.

Additional features, which alone or in combination with any other feature(s), such as those listed above and/or those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
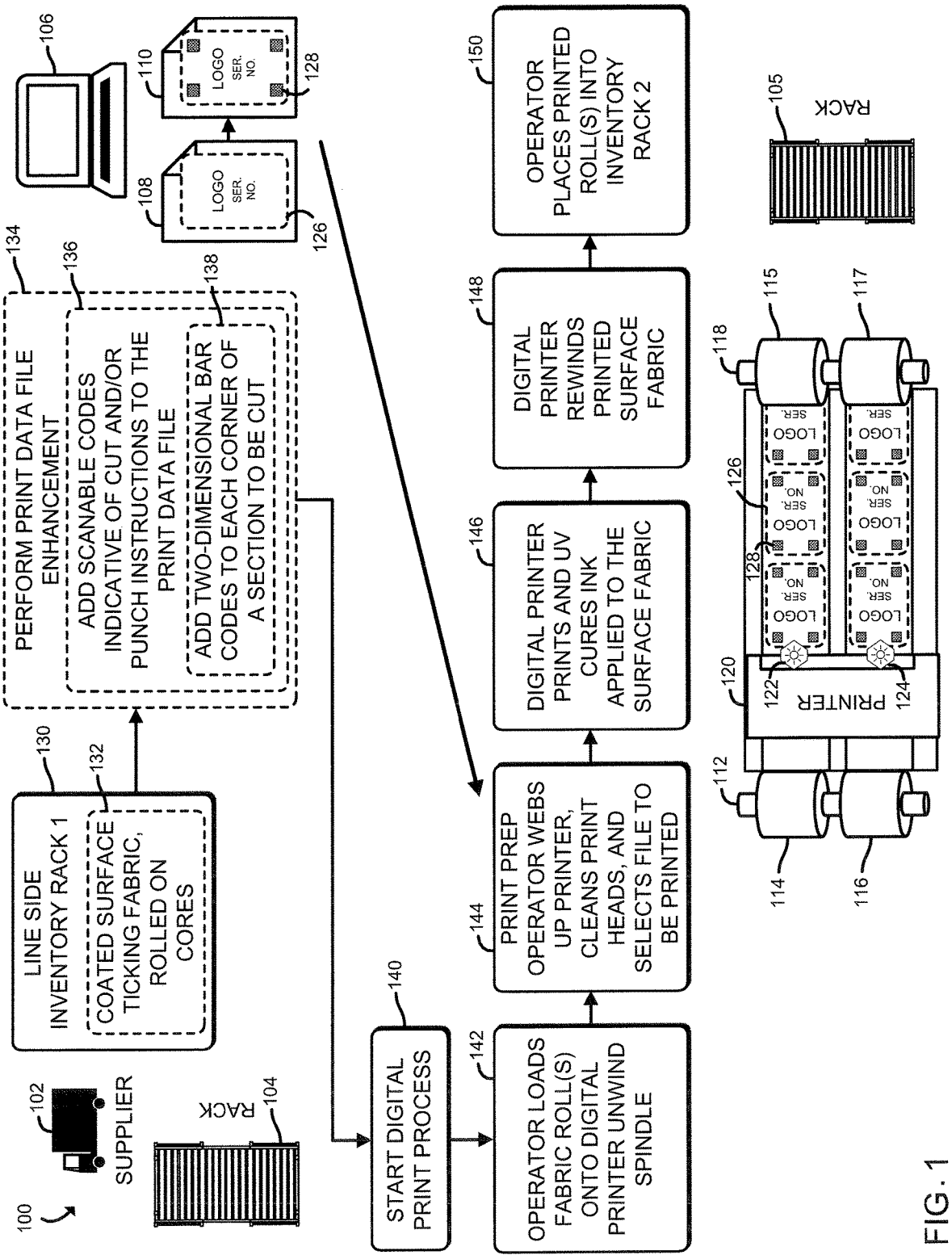
FIG. 1 is a block diagram of a method for performing roll-to-roll digital printing of content onto a material usable in a medical device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a method 100 for performing roll-to-roll digital printing of content onto a material usable in a medical device includes obtaining the material, such as from a supplier 102. In some embodiments, the material may include a woven ticking fabric that is coated (e.g., laminated) with polyurethane. One representative supplier of the material is Trelleborg AB of Trelleborg, Sweden. As indicated in blocks 130, 132 the material, also referred to herein as "surface fabric" or "coated surface ticking fabric," may be rolled on cores and may be temporarily placed on an inventory rack 104, which may be embodied as any structure capable of holding one or more rolls of the material.

As shown in block 134, the method 100 may additionally include performing an enhancement process on a print data file 108, which may be embodied as any file that defines instructions or other data that is usable by a printer device 120 to print content 126 (e.g., a company logo, a model identifier, such as a serial number, indicators of areas to be cut or punched, and/or other indicia) onto the material. For example, the print data file may be embodied as an Adobe Illustrator file, a Portable Document Format (PDF) file, or a Computer Aided Design (CAD) file.

The enhancement process may be performed with a computer device 106 that is configured to read the print data file 108 and produce a modified print data file 110. The enhancement process may include optimizing cut registration marks. In some embodiments, and as indicated in block 136, performing the enhancement includes adding one or more scannable codes 128 (e.g., detectable by a barcode reader, a camera, etc.) that are indicative of instructions for cutting a section of the material from the roll and, in some embodiments, punching one or more holes in the material. In other words, the scannable code(s) 128 may define the instructions for cutting and punching or may include an identifier (e.g., a Uniform Resource Locator (URL), a file name, etc.) of a file that defines the instructions for cutting and punching. As indicated in block 138, the code(s) may be embodied as two-dimensional barcodes (e.g., matrix barcodes, Quick Response codes, etc.) and may be placed at each corner of the section of the material that is to be cut. In some embodiments, the code(s) are placed in inconspicuous locations (e.g., not readily noticeable by a person) on the section of the material that is to be cut. Further, in some embodiments, the enhanced print data file may be embodied as a RIP file, which defines a high resolution bitmapped image that is ready for output (e.g., printing). The print data file enhancement may be performed by personnel that are on site (e.g., at the facility where the printing and cutting/punching will take place) or off site (e.g., by a manufacturer of a cutter device that will cut and punch the material, as described in more detail with respect to FIG. 2). While shown in a particular sequence in FIG. 1, it should be appreciate that block 134 may alternatively be performed prior to or concurrently with block 130.

In block 140, the digital print process is initiated. As indicated in block 142, an operator loads fabric rolls 114, 116 (i.e., the material from the rack 104) onto an unwind spindle 112 that will unwind the rolls 114, 116 to enable the printer device 120 (the "digital printer") to print content on the material. As indicated in block 144, an operator (a "print preparation operator") webs up the printer device 120 (e.g., unwinds the material from the rolls 114, 116 and feeds the material into the printer device 120). Additionally, the operator may clean print heads (e.g., ink jet print heads) of the printer device 120. Further, the operator, in the illustrative embodiment, selects (e.g., using a graphical user interface that indicates available print data files) the file to be printed (e.g., the modified print data file 110). While the method 100 is described as being performed with two rolls 114, 116 at a time, in other embodiments, only one roll may be printed to at a time. In some embodiments, one roll is printed to at a time and the roll may be slit into multiple narrower rolls before rewinding at the end of the method 100 (e.g., to produce blood pressure cuffs).

In block 146, the printer device 120 (the digital printer) prints the content to the material. In the illustrative embodiment, the printer device 120 prints the content 126 to the material using ink that is curable with ultraviolet light. Further, in the illustrative embodiment, the printer device 120 prints with white ink, as white ink has been found to have the highest opacity, the highest viscosity, and the highest thickness, thereby enhancing the durability of the print. The ticking fabric may be blue or dark blue in color, but other non-white ticking fabric used with white ink is also possible. In some embodiments, the printer device 120 may print with CMYK (Cyan, Magenta, Yellow, Black) process colors on top of white, to obtain a specific pantone color. Additionally, in the illustrative embodiment, the printer device 120 cures the ink using ultraviolet light emitter devices 122, 124, which may be located immediately after the print heads in the direction that the material is conveyed (e.g., towards spindle 118). In contrast to screen printing ink which may require days to cure, the ultraviolet light cured ink cures within seconds. In some embodiments, the printer device 120 may make multiple passes (e.g., repeatedly applying and curing layers of the ink) to increase the thickness and durability of the applied ink. Thus, printing white-on-white ink in two passes of the printer device 120 is contemplated by the present disclosure.

In the illustrative embodiment, the printer device 120 has a print bed that is at least twice as wide as each roll 114, 116, enabling the printer device 120 to print to multiple rolls of the material concurrently (e.g., printing to multiple rolls in the same pass of a print head of the printer device 120), as shown in FIG. 1. For example, in the illustrative embodiment, the print bed may be 10 feet wide while each fabric roll is 57 inches wide. An example printer device that meets these specifications is an EFI Pro 32r roll-to-roll printer (also referred to as the EFI Vutek 32r) from Electronics For Imaging, Inc. of Fremont, California. Another example is the Durst Rho 312R Plus from Durst Image Technology US, LLC of Rochester, New York. Other manufacturers of printer devices that may be usable with the method 100 are HP Inc. of Palo Alto, California and Roland DGA Corporation of Shizuoka, Japan (e.g., the VersaUV line of printers). In some embodiments, while multiple rolls may be printed to concurrently, different content may be printed to each roll 114, 116. While example widths of the rolls and the print bed the printer device 120 are provided above, in other embodiments, the widths may be different. Further, in some embodiments, the print bed is only wide enough to accommodate a single roll at a time. Additionally or alternatively, different print data files may be used for a given roll 114, such that one set of content is printed using one print data file, then a different set of content is printed using a second print data file, and so on as the material is fed through the printer device 120. As indicated in block 148, in the illustrative embodiment, the printer device 120 rewinds the material (the printed surface fabric) onto the spindle 118, into rolls 115, 117. Subsequently, an operator places the printed rolls into an inventory rack 105.

Figure 2:
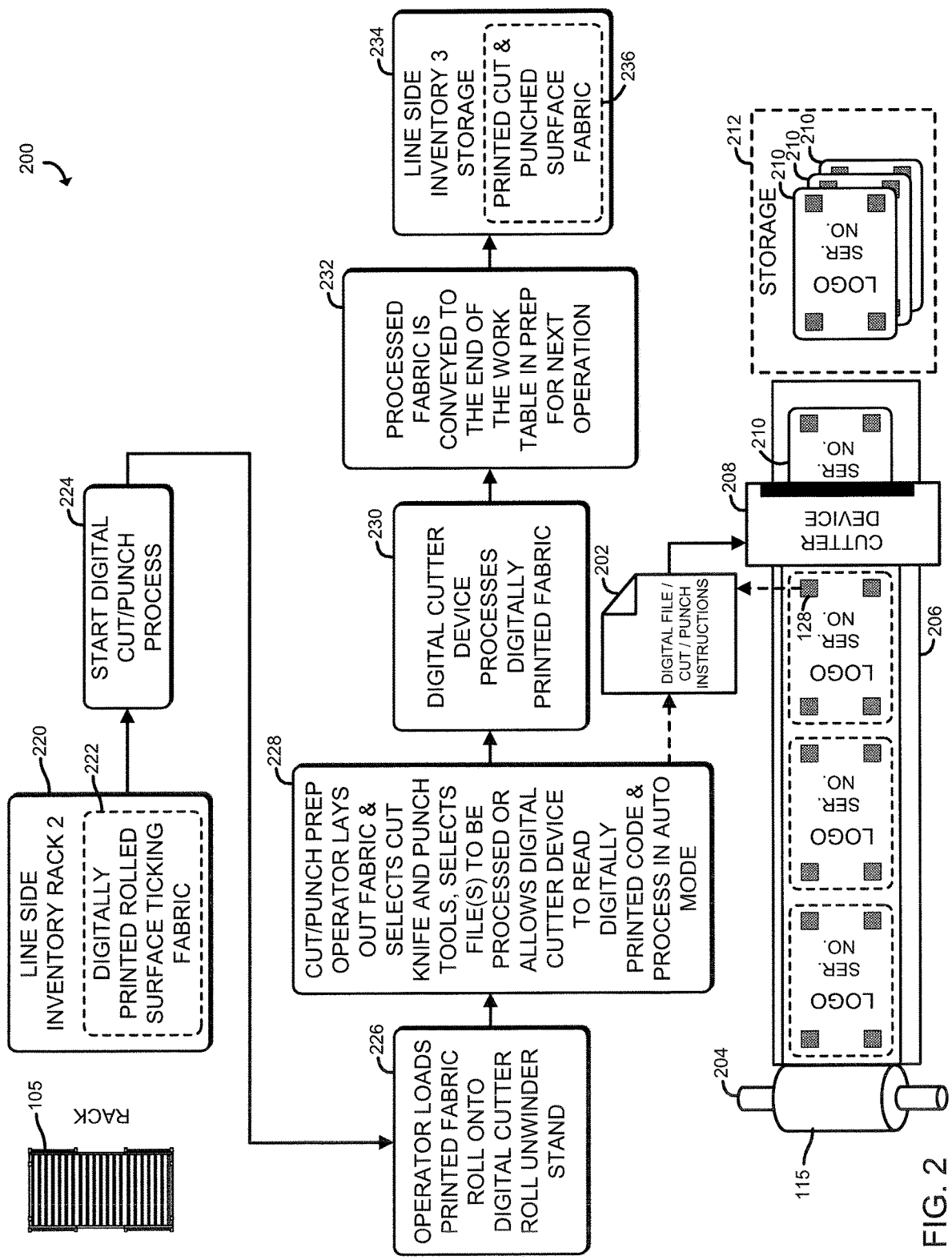
FIG. 2 is a block diagram of a method for performing digital cutting and punching of sections of the material from the method of FIG. 1.

Referring now to FIG. 2, a method 200 for performing digital cutting and punching of sections of the material begins with block 220, in which the material is obtained (e.g., from the rack 105). In the illustrative embodiment, the material is digitally printed (e.g., has had ink applied and cured by the printer device 120) rolled surface ticking fabric, as indicated in block 222. Once the material has been obtained, the digital cut and punch process is initiated, as indicated in block 224. As indicated in block 226, an operator loads the material (the printed fabric) 115 onto a digital cutter unwinder stand 204. In block 228, an operator (a cut/punch operator) lays out the material on a table 206, which, in the illustrative embodiment, is cut resistant (e.g., the table 206 may include DuPont Kevlar® or other cut-resistant material). Additionally, the operator may select a file 202 (e.g., a file that defines cutting and punching instructions usable to by a cutter device 208) to be processed. In other embodiments, the operator does not manually select a file. Rather, in such embodiments, the cutter device 208 may read a digitally printed code (e.g., the code 128) to obtain the instructions for cutting and punching the material.

In embodiments in which the code 128 identifies a file 202 that defines the instructions, the cutter device 208 may obtain the file 202 (e.g., by reading the file from a memory of the cutter device 208, by obtaining the file 202 from a remote computer device through a network using a URL defined in the code 128, etc.). In block 230, the cutter device 208 processes (e.g., cuts and, in some embodiments, punches) the material (the digitally printed fabric) according to the instructions. In doing so, in the illustrative embodiment, the cutter device 208 cuts and potentially punches the material in registration to (e.g., in alignment with, based on, as a function of, etc.) the content 126 that was printed on the material. For example, the content 126 may include an outline of a section 210 of the material that is to be cut out to form a portion of a medical device (e.g., a mattress topper) and the cutter device 208 may cut along the outline. The cutter device 208 may perform different cutting and/or punching operations for different sections of material that pass through the cutter device 208 (e.g., for different instruction files 202 selected by the operator or indicated by codes 128 printed on the material). In some embodiments, the cutter device 208 may detect, using a laser and/or a camera, the position of the edge of the material on the table 206 and correlate that detected position with a coordinate system defined in the instructions (e.g., in the file 202). Additionally, in some embodiments, when punching sections of the material, the cutter device 208 may suction away loose pieces of the material to lower the likelihood of debris interfering with other cutting and/or punching operations performed by the cutter device 208.

The cutter device 208 may be embodied as any device capable of cutting and/or punching the material in accordance with a defined set of parameters (e.g., the instructions in the file 202) as the material is conveyed across the table 206. For example, the cutter device 208 may be embodied as a Zünd G3 Digital Cutter, produced by Zünd Systemtechnik AG of Altstätten, Switzerland and may include a cutting tool (e.g., a cutting wheel, such as an octagonal cutting wheel), a processor capable of reading and executing instructions (e.g., instructions in the file 202), a punching tool, a suction device, and an edge detection device configured to detect the edge of the material on the table 206. Other manufacturers of digital cutter devices that may be usable with the method 200 include Gerber Technology of Tolland, Connecticut, Colex Finishing Solutions Inc. of Elmwood Park, New Jersey, and Atom s.p.a. of Vigevano, Italy.

Figure 3:
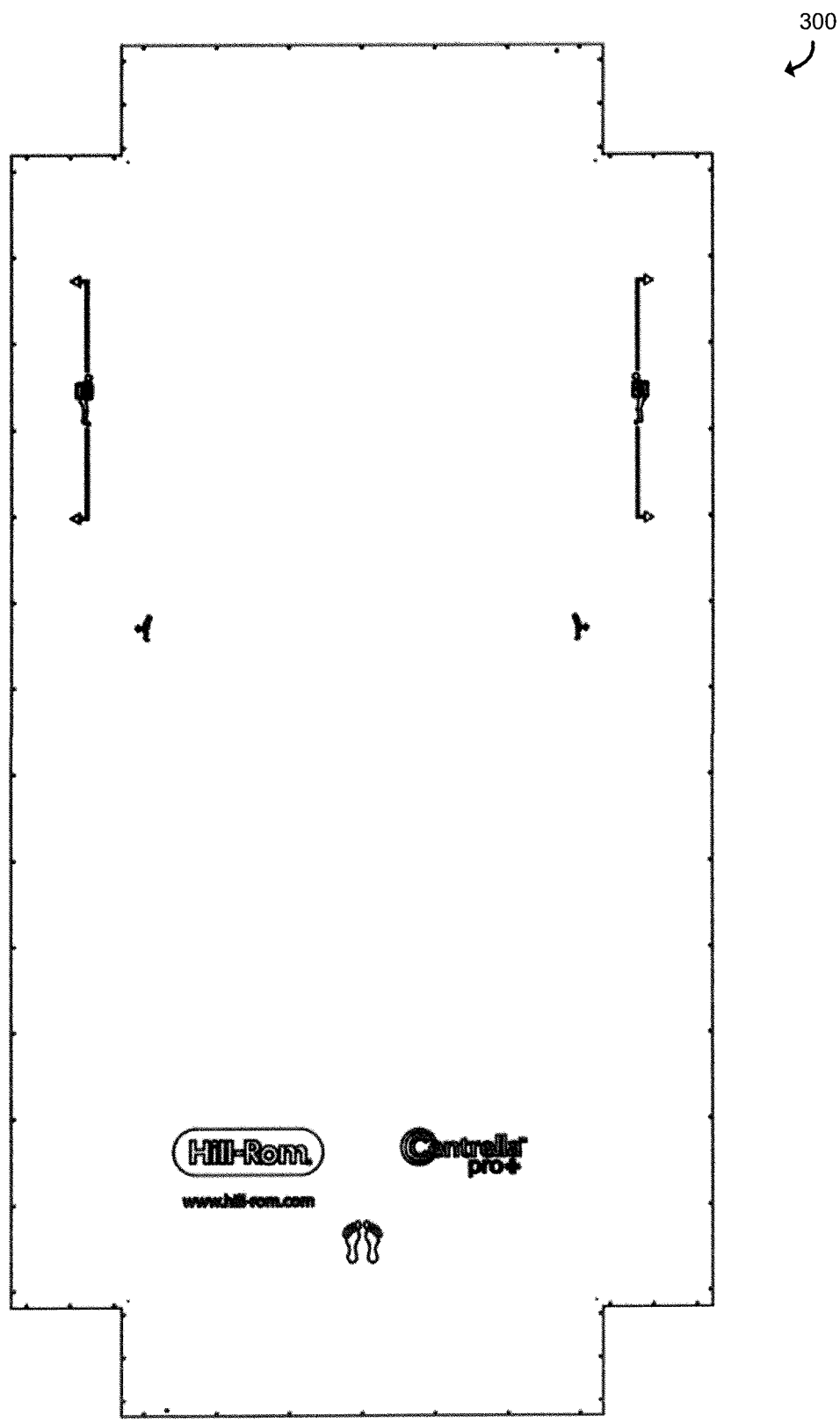
FIG. 3 is a top plan view of an embodiment of a layout of a printed, cut, and punched topper for a medical mattress that may be prepared using the methods of FIGS. 1 and 2.

As indicated in block 232, the processed fabric (e.g., the material, after being cut and/or punched by the cutter device 208) is conveyed to the end of the table 206 in preparation for a subsequent operation. As indicated in blocks 234, 236, sections 210 of the material that have been cut, and optionally punched, to form portions of medical equipment, may be held in storage 212 (e.g., a storage bin). An example layout 300 of a printed, cut, and punched topper for a mattress that may be prepared in accordance with the methods 100, 200 is shown in FIG. 3. In comparison to typical processes for preparing (e.g., printing, cutting, and/or punching) materials for use in medical equipment (e.g., as surfaces of medical equipment), the methods 100, 200 are significantly more efficient as they require less expense (e.g., as few as one human operator for printing and one human operator for cutting/punching as compared to multiple human operators for printing and multiple human operators for cutting/punching) and less time (e.g., less curing time and less loading/unloading time) to prepare a given amount of material. Additionally, the methods 100, 200 allow for inventory to be reduced, enable printing, cutting, and punching on demand, and reduce floor space requirements over typical methods.

Figure 4:
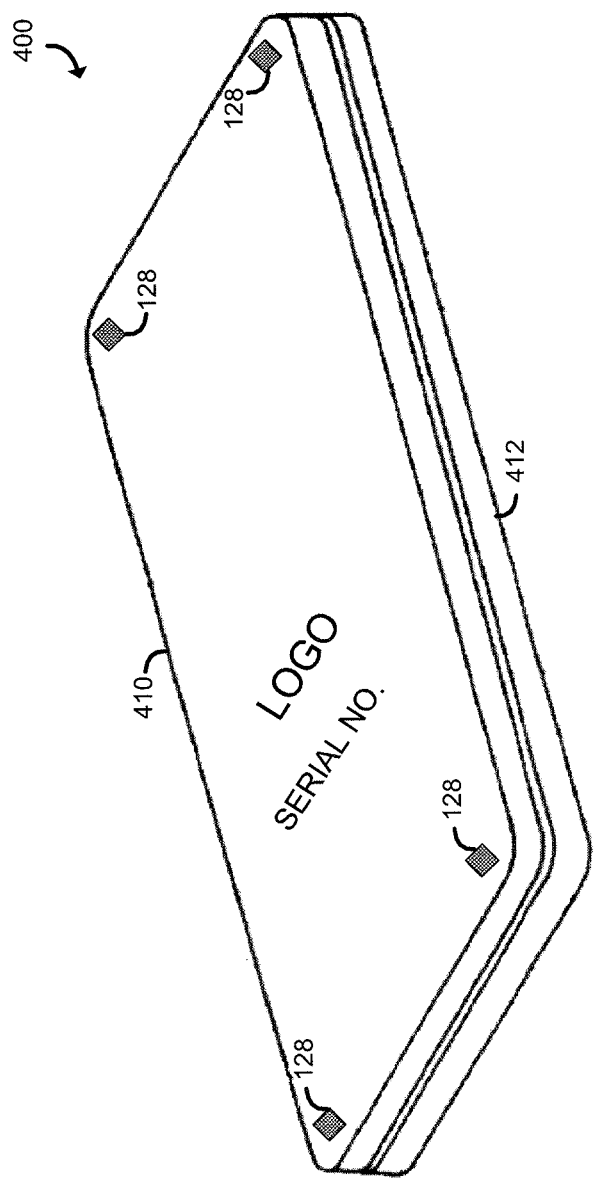
FIG. 4 is an isometric view of a medical mattress having the topper made from one or more sections of the material from FIGS. 1 and 2.

Referring now to FIG. 4, a patient mattress 400 may be formed from sections 210 of the material that have been printed to, cut, and punched in accordance with the methods 100, 200 of FIGS. 1 and 2. For example, two sections 410, 412, similar to the sections 210 of FIG. 2, may be mated together (e.g., by a zipper, stitching, or other mechanism) to form a flexible, protective shell around inner components (e.g., foam, air bladders, etc.) of the mattress 400. In the illustrative embodiment, the bottom section 412 may not have any content printed on it. The patient mattress 400 may be used, for example, in a patient bed, such as the patient bed described in U.S. Patent Application Publication No. 2019/0262201, which is incorporated herein by reference. While a patient mattress 400 is shown as an illustrative example, it should be appreciated that other medical devices (e.g., blood pressure cuffs) may be formed from sections of material that have been printed to, cut, and punched using the methods 100, 200 described above.

Figure 5:
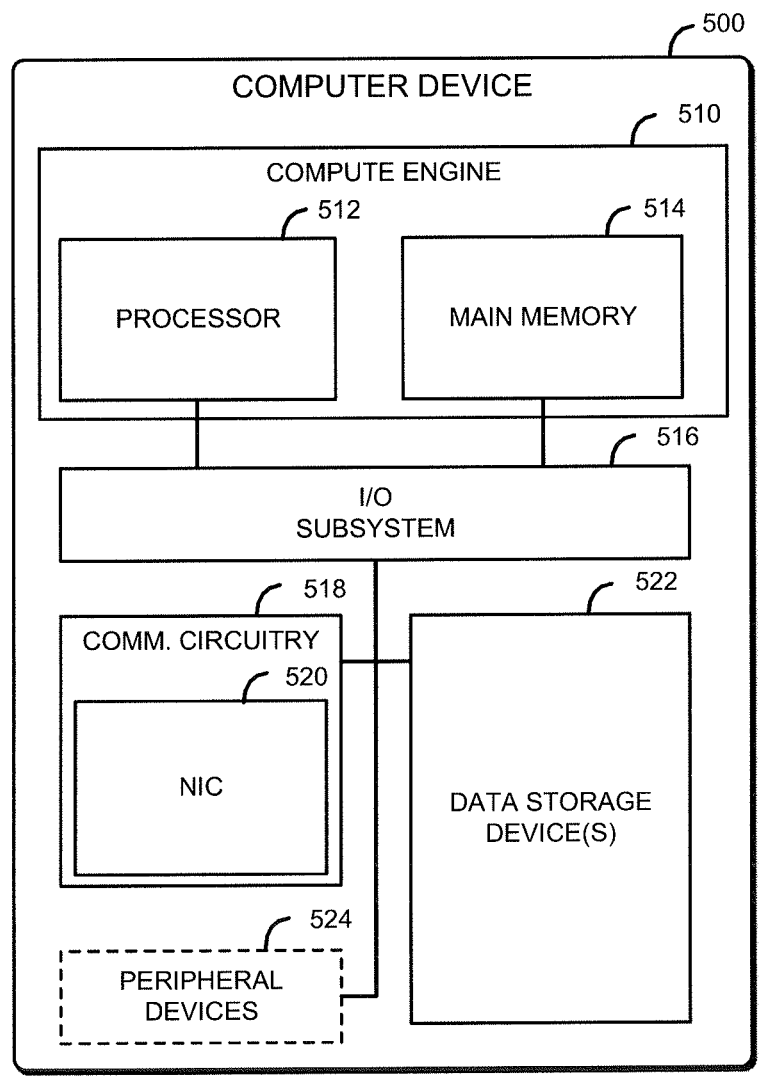
FIG. 5 is a block diagram of at least one embodiment of a computer device that may be used in the methods of FIGS. 1 and 2.

Referring now to FIG. 5, a computer device 500, which is representative of and includes components similar to the computer device 106, the printer device 120, and the cutter device 208 may be embodied as any type of computer device capable of performing the functions described herein, including reading instructions and executing the instructions to facilitate one or more of the methods 100, 200.

As shown in FIG. 5, the computer device 500 includes a compute engine 510, an input/output (I/O) subsystem 516, communication circuitry 518, and one or more data storage devices 522. Of course, in other embodiments, the computer device 500 may include other or additional components, such as those commonly found in a computer (e.g., display, peripheral devices, etc.). Additionally, in some embodiments, one or more of the illustrative components may be incorporated in, or otherwise form a portion of, another component.

The compute engine 510 may be embodied as any type of device or collection of devices capable of performing various compute functions, such as reading computer-executable instructions and executing the instructions. In some embodiments, the compute engine 510 may be embodied as a single device such as an integrated circuit, an embedded system, a field-programmable gate array (FPGA), a system-on-a-chip (SOC), or other integrated system or device. Additionally, in some embodiments, the compute engine 510 includes or is embodied as a processor 512 and a memory 514. The processor 512 may be embodied as any type of processor capable of performing the functions described herein. For example, the processor 512 may be embodied as a single or multi-core processor(s), a microcontroller, or other processor or processing/controlling circuit. In some embodiments, the processor 512 may be embodied as, include, or be coupled to an FPGA, an application specific integrated circuit (ASIC), reconfigurable hardware or hardware circuitry, or other specialized hardware to facilitate performance of the operations.

The main memory 514 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 514 may be integrated into the processor 512. In operation, the main memory 514 may store various software and data used during operation such as printing instructions, cutting instructions, punching instructions, applications, programs, libraries, and/or drivers.

The compute engine 510 is communicatively coupled to other components of the computer device 500 via the I/O subsystem 516, which may be embodied as circuitry and/or components to facilitate input/output operations with the compute engine 510 (e.g., with the processor 512 and/or the main memory 514) and other components of the computer device 500. For example, the I/O subsystem 516 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 516 may form a portion of a system-on-a-chip (SoC) and be incorporated, along with one or more of the processor 512, the main memory 514, and other components of the computer device 500, into the compute engine 510.

The communication circuitry 518 may be embodied as any communication circuit, device, or collection thereof, capable of enabling communications over a network between the computer device and another device. The communication circuitry 518 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 518 includes a network interface controller (NIC) 520. The NIC 520 may be embodied as one or more add-in-boards, daughter cards, network interface cards, controller chips, chipsets, or other devices that may be used by the computer device 500 to connect with another device. In some embodiments, the NIC 520 may be embodied as part of a system-on-a-chip (SoC) that includes one or more processors, or included on a multichip package that also contains one or more processors. In some embodiments, the NIC 520 may include a local processor (not shown) and/or a local memory (not shown) that are both local to the NIC 520. In such embodiments, the local processor of the NIC 520 may be capable of performing one or more of the functions of the compute engine 510. Additionally or alternatively, in such embodiments, the local memory of the NIC 520 may be integrated into one or more components of the computer device 500 at the board level, socket level, chip level, and/or other levels.

The one or more illustrative data storage devices 522, may be embodied as any type of devices configured for short-term or long-term storage of data such as, for example, memory devices and circuits, memory cards, hard disk drives, solid-state drives, or other data storage devices. Each data storage device 522 may include a system partition that stores data and firmware code for the data storage device 522. Each data storage device 522 may also include an operating system partition that stores data files and executables for an operating system.

Additionally or alternatively, the computer device 500 may include one or more peripheral devices 524. Such peripheral devices 524 may include any type of peripheral device commonly found in a compute device such as a display, speakers, a mouse, a keyboard, and/or other input/output devices, interface devices, and/or other peripheral devices. The peripheral devices 524 may additionally or alternatively include devices for printing (e.g., print head(s)), curing (e.g., ultraviolet light emitter devices), cutting (e.g., a cutting wheel), punching (e.g., a punching tool), detecting edges of material (e.g., a laser and/or camera), clearing debris (e.g., a suction device, such as a vacuum), and/or other operations of the methods 100, 200.

Devices used in the methods 100, 200 may be in communication via a network, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A medical device surface made by a process comprising:
    unwinding a material that includes woven ticking fabric laminated with polyurethane from a roll;
    printing, with an ink jet printer and using ink that is curable with ultraviolet light, content that includes a code that identifies a file having instructions for cutting the material, onto an upper surface of the material;
    curing the ink with the ultraviolet light;
    slitting the material;
    rewinding the material into a second roll after curing the ink with the ultraviolet light and slitting the material; and
    cutting a section of the material in registration to the content printed on the upper surface for use in a medical device that comprises the medical device surface.

2. The medical device surface of claim 1, wherein printing using ink that is curable with ultraviolet light comprises printing with white ink.

3. The medical device surface of claim 1, wherein printing using ink that is curable with ultraviolet light comprises printing multiple layers of the ink onto the upper surface.

4. The medical device surface of claim 1, wherein printing comprises printing onto multiple rolls of the material concurrently.

5. The medical device surface of claim 1, wherein printing content that includes the code comprises printing a two-dimensional barcode.

6. The medical device surface of claim 1, wherein printing the content that includes the code comprises printing the code at each of multiple corners of the section to be cut.

7. The medical device surface of claim 1, wherein cutting the section comprises cutting the section into at least a portion of a medical mattress topper.

8. The medical device surface of claim 1, wherein cutting the section comprises:
    cutting the section with a cutter device configured to read the file, wherein the file defines instructions for cutting the material into at least a portion of a medical device; and
    executing the instructions.

9. The medical device surface of claim 1, wherein cutting the section of the material comprises obtaining the file and cutting the section of the material based on the instructions.

10. The medical device surface of claim 1, wherein cutting the section comprises cutting the section into at least a portion of a blood pressure cuff.

11. The medical device surface of claim 1, further comprising punching at least one hole in the material.

12. The medical device surface of claim 1, wherein printing content that includes the code that identifies the file having instructions for cutting comprises printing content that includes a code that encodes a uniform resource locator or file name of the file having instructions for cutting.

13. The medical device surface of claim 1, wherein the material includes cut registration marks.

14. The medical device surface of claim 1, wherein the file defines a bitmapped image.

15. The medical device surface of claim 1, wherein slitting the material comprises slitting the material into multiple narrower rolls before rewinding.

16. The medical device surface of claim 1, wherein printing using ink that is curable with ultraviolet light comprises printing white-on-white ink in a plurality of passes of the ink jet printer.

17. The medical device surface of claim 1, wherein printing using ink that is curable with ultraviolet light comprises first printing with white ink and then printing with a non-white ink over the white ink.

18. The medical device surface of claim 17, wherein the non-white ink comprises any one or more of Cyan, Magenta, Yellow, or Black ink.

19. The medical device surface of claim 1, wherein curing the ink with the ultraviolet light comprises emitting ultraviolet light from multiple emitter devices.

20. The medical device surface of claim 19, wherein the multiple emitter devices are located immediately following one or more print heads of the ink jet printer in a direction that the material is conveyed.

\* \* \* \* \*